United States Patent
Tsunogae et al.

(10) Patent No.: US 11,535,696 B2
(45) Date of Patent: *Dec. 27, 2022

(54) CROSSLINKABLE COMPOSITION AND CROSSLINKED PRODUCT

(71) Applicant: ZEON CORPORATION, Tokyo (JP)

(72) Inventors: Yasuo Tsunogae, Tokyo (JP); Shingo Okuno, Tokyo (JP); Hiroyuki Nitadori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 209 days.

This patent is subject to a terminal disclaimer.

(21) Appl. No.: 16/342,933

(22) PCT Filed: Oct. 25, 2017

(86) PCT No.: PCT/JP2017/038510
§ 371 (c)(1),
(2) Date: Apr. 17, 2019

(87) PCT Pub. No.: WO2018/079603
PCT Pub. Date: May 3, 2018

(65) Prior Publication Data
US 2020/0055975 A1 Feb. 20, 2020

(30) Foreign Application Priority Data
Oct. 31, 2016 (JP) .............................. JP2016-212963

(51) Int. Cl.
| | | |
|---|---|---|
| *C08G 18/62* | (2006.01) | |
| *C08F 290/06* | (2006.01) | |
| *C08G 18/24* | (2006.01) | |
| *C08G 18/76* | (2006.01) | |
| *C08G 59/62* | (2006.01) | |
| *C08G 61/08* | (2006.01) | |
| *C08G 77/42* | (2006.01) | |

(52) U.S. Cl.
CPC ............ *C08G 18/62* (2013.01); *C08F 290/06* (2013.01); *C08G 18/242* (2013.01); *C08G 18/6204* (2013.01); *C08G 18/6208* (2013.01); *C08G 18/7671* (2013.01); *C08G 59/625* (2013.01); *C08G 61/08* (2013.01); *C08G 77/42* (2013.01)

(58) Field of Classification Search
CPC .... C08G 61/08; C08G 18/62; C08G 18/6204; C08G 18/6208
See application file for complete search history.

(56) References Cited

U.S. PATENT DOCUMENTS

| | | | |
|---|---|---|---|
| 3,857,825 A | 12/1974 | Streck et al. | |
| 3,974,092 A * | 8/1976 | Streck ................... | C08G 61/08 502/117 |
| 5,512,635 A | 4/1996 | Nubel et al. | |
| 5,589,543 A * | 12/1996 | Yokelson ............... | C08G 18/69 525/131 |
| 6,060,570 A | 5/2000 | Nubel et al. | |
| 6,143,851 A | 11/2000 | Nubel et al. | |
| 2002/0111447 A1* | 8/2002 | Peters ..................... | C08L 71/02 526/171 |
| 2002/0169263 A1 | 11/2002 | Maughon et al. | |
| 2009/0305018 A1 | 12/2009 | Ohtaki et al. | |
| 2009/0306268 A1* | 12/2009 | Pawlow ................ | C08L 19/006 524/435 |
| 2010/0124615 A1 | 5/2010 | Ohtaki et al. | |
| 2010/0324247 A1 | 12/2010 | Kojima et al. | |
| 2011/0144292 A1 | 6/2011 | Kojima et al. | |
| 2012/0296035 A1 | 11/2012 | Tsunogae et al. | |
| 2013/0172635 A1 | 7/2013 | Hannen et al. | |

FOREIGN PATENT DOCUMENTS

| | | | |
|---|---|---|---|
| CN | 101415772 A | 4/2009 | |
| DE | 4133978 A1 | 4/1993 | |
| EP | 0 982 332 A1 | 3/2000 | |
| EP | 1 589 054 A1 | 10/2005 | |
| EP | 1 990 364 A1 | 11/2008 | |
| JP | H11-514043 A | 11/1999 | |
| JP | 2002-317034 A | 10/2002 | |
| JP | 2010-037362 A | 2/2010 | |
| JP | 2010-116458 A | 5/2010 | |
| JP | 2012-197392 A | 10/2012 | |
| JP | 2013-144813 A | 7/2013 | |
| JP | 2013-529695 A | 7/2013 | |
| WO | 2011/087072 A1 | 7/2011 | |
| WO | WO-2015047840 A1 * | 4/2015 | ............. C08G 61/06 |
| WO | 2015/194638 A2 | 12/2015 | |

OTHER PUBLICATIONS

May 29, 2020 Extended Search Report issued in European Patent Application No. 17864988.5.
Jan. 30, 2018 International Search Report issued in International Patent Application No. PCT/JP2017/038510.
Apr. 30, 2019 International Preliminary Report on Patentability issued in International Patent Application No. PCT/JP2017/038510.

* cited by examiner

*Primary Examiner* — Ling Siu Choi
*Assistant Examiner* — David L Miller
(74) *Attorney, Agent, or Firm* — Oliff PLC

(57) ABSTRACT

A crosslinkable composition containing: a liquid monocyclic olefin ring-opened polymer (A) having a reactive group at a polymer chain end thereof and a weight-average molecular weight (Mw) of 1,000 to 50,000; and a crosslinkable compound (B) having, in the molecule, two or more functional groups reactive with the reactive group at the polymer chain end of the monocyclic olefin ring-opened polymer (A).

13 Claims, No Drawings

CROSSLINKABLE COMPOSITION AND CROSSLINKED PRODUCT

TECHNICAL FIELD

The present invention relates to a crosslinkable composition containing a liquid monocyclic olefin ring-opened polymer and a crosslinkable compound, and more particularly relates to a crosslinkable composition which can apply a crosslinked product having high tensile strength and excellent heat resistance and ozone resistance.

BACKGROUND ART

Since a liquid diene elastomer such as liquid polybutadiene or liquid polyisoprene has a double bond in a polymer main chain and has excellent rubber elasticity, the liquid diene elastomer is used as a component for an adhesive, a coating agent, a paint, a sealing material, and the like. For the purposes of improving affinity and adhesiveness of the liquid diene elastomer with a substrate to be bonded or a substrate to which the liquid diene elastomer is applied, and of crosslinking the liquid diene elastomer to increase mechanical strength, there has been known a technique for crosslinking a denatured liquid diene elastomer obtained by introducing a reactive group into the liquid diene elastomer to obtain a crosslinked product.

However, the crosslinked product of the liquid diene elastomer has insufficient mechanical strength such as tensile strength or peel strength. In addition, the crosslinked product also has the following problem: the crosslinked product has poor heat resistance and ozone resistance. Therefore, there has been required a liquid elastomer having higher mechanical strength and excellent heat resistance and ozone resistance.

Meanwhile, there has been known a technique for subjecting a cyclic olefin to a metathesis ring-opening polymerization reaction in the presence of a chain transfer agent to obtain a cyclic olefin ring-opened polymer. For example, Patent Document 1 discloses a technique for subjecting a cyclic olefin to metathesis ring-opening polymerization using a ruthenium catalyst in the presence of a reactive group-containing olefin, to obtain a cyclic olefin ring-opened polymer having a reactive group at a polymer chain end thereof. Patent Document 1 discloses that the amount of introduction of the reactive group in the obtained cyclic olefin ring-opened polymer can be adjusted by adjusting the ratio of the reactive group-containing olefin and the cyclic olefin.

Patent Document 2 discloses a cyclic olefin ring-opened polymer hydrogenated product obtained by partially hydrogenating a carbon-carbon double bond in the main chain structure of a cyclic olefin ring-opened polymer having a weight-average molecular weight of 1,000 to 100,000.

However, the techniques described in Patent Documents 1 and 2 do not disclose a technique for obtaining a liquid cyclic olefin ring-opened polymer, and the polymers cannot be applied as an alternative material of the liquid diene elastomer. In particular, the technique of Patent Document 2 hydrogenates the cyclic olefin ring-opened polymer but causes the hydrogenation reaction to provide a resinous polymer.

Patent Document 3 discloses a liquid octenamer obtained by subjecting cyclooctene as a cyclic olefin to ring-opening polymerization. However, the technique of Patent Document 3 does not denature the liquid octenamer to obtain a crosslinked product, so that sufficient mechanical strength cannot be obtained.

RELATED ART

Patent Documents

Patent Document 1: National Publication of International Patent Application No. Heisei 11-514043
Patent Document 2: Japanese Patent Laid-Open No. 2002-317034
Patent Document 3: National Publication of International Patent Application No. 2013-529695

SUMMARY OF THE INVENTION

Problem to be Solved by the Invention

The present invention was made in view of such an actual situation, and an object of the present invention is to provide a crosslinkable composition which can apply a crosslinked product having high tensile strength and excellent heat resistance and ozone resistance.

Means for Solving the Problem

The present inventors engaged in intensive research for achieving the above object and as a result discovered that the above object can be achieved by a crosslinkable composition obtained by blending a liquid monocyclic olefin ring-opened polymer having a reactive group at a polymer chain end thereof and a predetermined molecular weight with a crosslinkable compound having, in the molecule, two or more functional groups reactive with the reactive group at the polymer chain end, and thereby completed the present invention.

That is, the present invention provides a crosslinkable composition containing: a liquid monocyclic olefin ring-opened polymer (A) having a reactive group at a polymer chain end thereof and a weight-average molecular weight (Mw) of 1,000 to 50,000; and a crosslinkable compound (B) having, in the molecule, two or more functional groups reactive with the reactive group at the polymer chain end of the monocyclic olefin ring-opened polymer W.

In the crosslinkable composition of the present invention, the monocyclic olefin ring-opened polymer (A) is preferably a polymer containing only a structural unit derived from a monocyclic monoolefin, or a copolymer containing a structural unit derived from a monocyclic monoolefin and a structural unit derived from a monomer copolymerizable with a monocyclic monoolefin.

In the crosslinkable composition of the present invention, the monocyclic olefin ring-opened polymer (A) is preferably a polymer containing only a structural unit derived from cyclopentene, or a copolymer containing a structural unit derived from cyclopentene and a structural unit derived from a monomer copolymerizable with cyclopentene.

In the crosslinkable composition of the present invention, preferably, the reactive group at the polymer chain end of the monocyclic olefin ring-opened polymer (A) is a hydroxyl group or a hydroxycarbonyl group, and the functional group of the crosslinkable compound (B) is an isocyanate group, an epoxy group, or an amino group.

In the crosslinkable composition of the present invention, preferably, the reactive group at the polymer chain end of the monocyclic olefin ring-opened polymer (A) is a methacryloyloxy group, and the functional group of the crosslinkable compound (B) is a methacryloyloxy group or an acryloyloxy group.

In the crosslinkable composition of the present invention, the monocyclic olefin ring-opened polymer (A) preferably has a melt viscosity of 3,000 Pa·s or less as measured at a temperature of 25° C. using a Brookfield viscometer.

In the crosslinkable composition of the present invention, the monocyclic olefin ring-opened polymer (A) preferably has a glass transition temperature of −50° C. or less.

In the crosslinkable composition of the present invention, preferably, the reactive group at the polymer chain end of the monocyclic olefin ring-opened polymer (A) is an oxysilyl group, and the functional group of the crosslinkable compound (B) is an oxysilyl group, an amino group, or an epoxy group.

The present invention provides a crosslinked product obtained by reacting the monocyclic olefin ring-opened polymer (A) in the crosslinkable composition with the crosslinkable compound (B).

Effects of Invention

The present invention can provide a crosslinkable composition which can apply a crosslinked product having high tensile strength and excellent heat resistance and ozone resistance, and the crosslinked product which is obtained by using the crosslinkable composition and has high tensile strength and excellent heat resistance and ozone resistance.

DESCRIPTION OF EMBODIMENTS

A crosslinkable composition of the present invention contains: a liquid monocyclic olefin ring-opened polymer (A) having a reactive group at a polymer chain end thereof and a weight-average molecular weight (Mw) of 1,000 to 50,000; and a crosslinkable compound (B) having, in the molecule, two or more functional groups reactive with the reactive group at the polymer chain end of the monocyclic olefin ring-opened polymer W.

<Liquid Monocyclic Olefin Ring-Opened Polymer (A)>

A liquid monocyclic olefin ring-opened polymer (A) used in the present invention is a polymer containing a repeating unit obtained by subjecting a monocyclic olefin to ring-opening polymerization as a repeating unit which forms a main chain thereof, and is a liquid polymer having a reactive group at a polymer chain end thereof and a weight-average molecular weight (Mw) of 1,000 to 50,000.

In the liquid monocyclic olefin ring-opened polymer (A) used in the present invention, the ratio of the repeating unit obtained by subjecting a monocyclic olefin to ring-opening polymerization is preferably 70 mol % or more, more preferably 75 mol % or more, and still more preferably 80 mol % or more based on all repeating units. However, as long as the characteristics of the monocyclic olefin ring-opened polymer are maintained, the liquid monocyclic olefin ring-opened polymer (A) may contain a repeating unit derived from other monomer copolymerizable with the monocyclic olefin. The ratio of the repeating unit derived from other monomer is preferably 30 mol % or less, more preferably 25 mol % or less, and still more preferably 20 mol % or less based on all the repeating units. The monocyclic olefin is a hydrocarbon compound which contains one ring and has a carbon-carbon double bond in the ring. The monocyclic olefin may have one carbon-carbon double bond or a plurality of carbon-carbon double bonds (containing no aromatic ring).

Specific examples of the monocyclic olefin include a monocyclic monoolefin having a carbon-carbon double bond in a ring thereof such as cyclobutene, cyclopentene, cyclohexene, cycloheptene, or cyclooctene; a monocyclic diene having two carbon-carbon double bonds in a ring thereof such as 1,4-cyclohexadiene, 1,4-cycloheptadiene, or 1,5-cyclooctadiene; and a monocyclic trien having three carbon-carbon double bonds in a ring thereof such as 1,5,9-cyclododecatriene. Among these, a monocyclic monoolefin is preferred, and cyclopentene is more preferred. The monocyclic olefin may have a substituent group, or may not have a substituent group. Examples of the substituent group include, but are not particularly limited to, alkyl groups such as a methyl group and an ethyl group.

Examples of the other monomer copolymerizable with the monocyclic olefin include a polycyclic monoolefin, a polycyclic diene, and a polycyclic trien. As the polycyclic monoolefin, the polycyclic diene, and the polycyclic trien, norbornene compounds which may have a substituent group such as 2-norbornene, dicyclopentadiene, 1,4-methano-1,4,4a,9a-tetrahydro-9H-fluorene, and tetracyclo[6.2.1.1$^{3,6}$.0$^{2,7}$] dodec-4-ene are illustrated. Among these, the polycyclic monoolefin and the polycyclic diene are preferred, and 2-norbornene and dicyclopentadiene are more preferred.

When the liquid monocyclic olefin ring-opened polymer (A) is a copolymer, the liquid monocyclic olefin ring-opened polymer (A) may be a copolymer of one monocyclic olefin and a monomer other than one or two or more monocyclic olefins, a copolymer of two or more monocyclic olefins, or a copolymer of two or more monocyclic olefins and a monomer other than one or two or more monocyclic olefins. When the monocyclic olefin ring-opened polymer has structural units derived from two or more monocyclic olefins, the ratio of the structural units derived from all the monocyclic olefins contained in the monocyclic olefin ring-opened polymer may be set to be within the above range.

From the viewpoint of more excellent heat resistance and ozone resistance, the liquid monocyclic olefin ring-opened polymer (A) used in the present invention is preferably a polymer containing only a structural unit derived from a monocyclic monoolefin as a repeating unit which forms a main chain thereof, or a copolymer containing a structural unit derived from a monocyclic monoolefin and a structural unit derived from a monomer copolymerizable with a monocyclic monoolefin (also containing a structural unit derived from a monocyclic olefin other than a monocyclic monoolefin), and more preferably a polymer containing only a structural unit derived from cyclopentene, or a copolymer containing a structural unit derived from cyclopentene and a structural unit derived from a monomer copolymerizable with cyclopentene (also containing a structural unit derived from a monocyclic olefin other than cyclopentene). The monomer copolymerizable with cyclopentene is preferably a monocyclic diolefin, a polycyclic monoolefin, and a polycyclic diene, and more preferably 1,5-cyclooctadiene, 2-norbornene, and dicyclopentadiene.

When the liquid monocyclic olefin ring-opened polymer (A) used in the present invention is the polymer containing a structural unit derived from a monocyclic monoolefin, the ratio of the structural unit derived from a monocyclic monoolefin is preferably 70 mol % or more, more preferably 75 mol % or more, and still more preferably 80 mol % or more based on all the repeating units. Meanwhile, the ratio of the structural unit derived from a monomer copolymerizable with a monocyclic monoolefin is preferably 30 mol % or less, more preferably 25 mol % or less, and still more preferably 20 mol % or less based on all the repeating units.

When the liquid monocyclic olefin ring-opened polymer (A) used in the present invention is the polymer containing a structural unit derived from cyclopentene, the ratio of the structural unit derived from cyclopentene is preferably 70 mol % or more, more preferably 75 mol % or more, and still more preferably 80 mol % or more based on all the repeating units. Meanwhile, the ratio of the structural unit derived from a monomer copolymerizable with cyclopentene is preferably 30 mol % or less, more preferably 25 mol % or less, and still more preferably 20 mol % or less based on all the repeating units.

The weight-average molecular weight (Mw) of the liquid monocyclic olefin ring-opened polymer (A) used in the present invention is measured by gel permeation chromatography in terms of polystyrene, and 1,000 to 50,000, preferably 1,500 to 45,000, and more preferably 2,000 to 40,000. When the weight-average molecular weight (Mw) is too low, the obtained crosslinked product has poor mechanical strength such as tensile strength. Meanwhile, when the weight-average molecular weight (Mw) is too high, the monocyclic olefin ring-opened polymer does not exhibit a liquid form.

The ratio (Mw/Mn) of the weight-average molecular weight (Mw) and number average molecular weight (Mn) measured by gel permeation chromatography in terms of polystyrene, of the liquid monocyclic olefin ring-opened polymer (A) used in the present invention is not particularly limited, and usually 4.0 or less, preferably 3.5 or less, and more preferably 3.0 or less. By setting Mw/Mn to be within the above range, the mechanical strength such as tensile strength, of the obtained crosslinked product can be further increased.

The liquid monocyclic olefin ring-opened polymer (A) used in the present invention is a liquid polymer, i.e., a polymer having a liquid state at normal temperature (25° C.) (having fluidity at normal temperature (25° C.)). Specifically, the liquid monocyclic olefin ring-opened polymer (A) is a polymer having fluidity at normal temperature (25° C.) such that a melt viscosity measured at a temperature of 25° C. using a Brookfield viscometer is about 3,000 Pa·s or less. In the present invention, the use of such a liquid monocyclic olefin ring-opened polymer (A) can provide good reactivity with the crosslinkable compound (B) described below, and thereby the crosslinked product having high tensile strength and excellent heat resistance and ozone resistance can be provided. The use of the liquid monocyclic olefin ring-opened polymer (A) makes it possible to suitably use the crosslinkable composition of the present invention and the crosslinked product obtained by crosslinking the crosslinkable composition for an application in which fluidity is required before crosslinking and an application in which the crosslinkable composition having fluidity is suitable before crosslinking. The melt viscosity at a temperature of 25° C. of the liquid monocyclic olefin ring-opened polymer (A) used in the present invention is preferably 2,000 Pa·s or less, more preferably 1,000 Pa·s or less, and still more preferably 300 Pa·s or less.

In the double bond present in the repeating unit which forms the liquid monocyclic olefin ring-opened polymer (A) used in the present invention, the cis/trans-ratio thereof is not particularly limited, and is preferably in the range of 15/85 to 60/40, and more preferably in the range of 15/85 to 40/60 from the viewpoint that heat resistance and ozone resistance can be further improved. The cis/trans-ratio can be measured by the $^{13}$C-NMR spectroscopy of the liquid monocyclic olefin ring-opened polymer (A).

A method for setting the cis/trans-ratio of the liquid monocyclic olefin ring-opened polymer (A) to be within the above range is not particularly limited, and examples thereof include a method for polymerizing a monocyclic olefin and controlling a polymerization condition when a liquid monocyclic olefin ring-opened polymer (A) is obtained. In one example, a trans ratio can be increased as a polymerization temperature when a monocyclic olefin is polymerized is increased. The trans ratio can be increased as a monomer concentration in a polymerization solution is decreased.

From the viewpoint of providing the crosslinked product having excellent low-temperature characteristics and having rubber elasticity, the glass transition temperature (Tg) of the liquid monocyclic olefin ring-opened polymer (A) used in the present invention is preferably −50° C. or less, more preferably −60° C. or less, and still more preferably −70° C. or less. The glass transition temperature of the liquid monocyclic olefin ring-opened polymer (A) can be adjusted by adjusting, for example, a cis/trans-ratio in a double bond present in a repeating unit, and the content ratio of a structural unit derived from a monomer copolymerizable with a monocyclic olefin, or the like when the liquid monocyclic olefin ring-opened polymer (A) is a copolymer.

In the liquid monocyclic olefin ring-opened polymer (A) used in the present invention, the melt viscosity measured at a temperature of 25° C. using a Brookfield viscometer may be within the above range. The liquid monocyclic olefin ring-opened polymer (A) may have a melting point. When the liquid monocyclic olefin ring-opened polymer (A) has a melting point, the melting point (Tm) is preferably less than 25° C. When the melting point (Tm) of the liquid monocyclic olefin ring-opened polymer is less than 25° C., the monocyclic olefin ring-opened polymer is a liquid polymer at normal temperature (25° C.), which is likely to provide the effects of the present invention.

The liquid monocyclic olefin ring-opened polymer (A) used in the present invention has a reactive group at a polymer chain end thereof. The reactive group is not particularly limited, and is preferably a reactive group containing an atom selected from the group consisting of an atom of Group XV in the Periodic Table, an atom of Group XVI in the Periodic Table, a silicon atom, and a halogen atom. From the viewpoints of the reactivity with the crosslinkable compound (B) described below and the heat resistance of the obtained crosslinked product, a reactive group containing an atom selected from the group consisting of a nitrogen atom, an oxygen atom, a phosphorus atom, a sulfur atom, a silicon atom, and a halogen atom is more preferred. Among these, a reactive group containing an atom selected from the group consisting of a nitrogen atom, an oxygen atom, and a silicon atom is still more preferred. Specific examples of the reactive group include an amino group, a hydroxyl group, a hydroxycarbonyl group, a carboxylic anhydride group, an acryloyloxy group, a methacryloyloxy group, an epoxy group, an oxysilyl group, and a halogen atom. Among these, from the viewpoint of reactivity, an amino group, a hydroxyl group, a hydroxycarbonyl group, a methacryloyloxy group, and an oxysilyl group are preferred. Specific examples of the oxysilyl group include an alkoxysilyl group, an aryloxysilyl group, an acyloxysilyl group, an alkylsiloxysilyl group, an arylsiloxysilyl group, and a hydroxysilyl group. Among these, the alkoxysilyl group is preferred. The alkoxysilyl group is a group having a silicon atom which is bonded with one or more alkoxy groups. Specific examples thereof include a trimethoxysilyl group, a (dimethoxy)(methyl)silyl group, a (methoxy)(dimethyl)silyl group, a triethoxysilyl group, a (diethoxy) (methyl)silyl group, an (ethoxy)(dimethyl)silyl group, a (dimethoxethoxy)silyl group, a (methoxy)(diethoxy)silyl group, a tripropoxysilyl group, and a tributoxysilyl group.

The liquid monocyclic olefin ring-opened polymer (A) used in the present invention may be one in which the reactive group is introduced to only one polymer chain end (single end), or may be one in which the reactive group is introduced to each of both polymer chain ends (both ends), or these may be mixed. Furthermore, in the liquid monocyclic olefin ring-opened polymer (A) used in the present invention, these may be mixed with a liquid monocyclic olefin ring-opened polymer in which no reactive group is introduced to a polymer chain end.

The ratio of introduction of the reactive group at the polymer chain end of the liquid monocyclic olefin ring-opened polymer (A) is not particularly limited, and from the viewpoints of the reactivity with the crosslinkable compound (B) described below and the heat resistance of the obtained crosslinked product, the percentage value of the ratio of the number of the reactive groups to the number of polymer chains of the liquid monocyclic olefin ring-opened polymer (A) is preferably 60% or more, more preferably 80% or more, and still more preferably 100% or more. The method for measuring the ratio of introduction of the reactive group to the polymer chain end is not particularly limited, and the ratio can be determined from, for example, the peak area ratio relative to the reactive group determined by $^1$H-NMR spectroscopy, and the number average molecular weight (Mn) determined by gel permeation chromatography.

The method for synthesizing the liquid monocyclic olefin ring-opened polymer (A) used in the present invention is not particularly limited as long as the intended polymer is obtained, and such a polymer may be synthesized by an ordinary method. The method is suitably (I) a method for subjecting a monomer containing a monocyclic olefin to ring-opening polymerization using a ring-opening polymerization catalyst having resistance to a reactive group in the presence of an olefin compound having a reactive group and producing no insoluble component, (II) a method for subjecting a monomer containing a monocyclic olefin to ring-opening polymerization using a ring-opening polymerization catalyst having no resistance to a reactive group in the presence of an olefin compound having a reactive group protected by a protective group and producing no insoluble component, to deprotect the reactive group protected by the protective group introduced to the end of the obtained polymer chain, and (III) a method for converting the reactive group at the polymer chain end synthesized in the above (I) or (II) into another reactive group.

In (I) the method for subjecting a monomer containing a monocyclic olefin to ring-opening polymerization using a ring-opening polymerization catalyst having resistance to a reactive group in the presence of an olefin compound having a reactive group, the olefin compound having a reactive group is used without particular limitation as long as the olefin compound contains at least one ethylenic unsaturated bond and at least one reactive group in the molecule. Examples of the reactive group include an amino group, a hydroxyl group, a hydroxycarbonyl group, a carboxylic anhydride group, a methacryloyloxy group, an epoxy group, an oxysilyl group, and a halogen atom.

Examples of the olefin compound having the amino group include allylamine, N-allylamine, N-allylbenzylamine, 4-aminostyrene, 2-butene-1,4-diamine, and 3-hexene-2,5-diamine.

Examples of the olefin compound having the hydroxyl group include allylalcohol, 3-buten-1-ol, 4-penten-1-ol, 4-hexen-1-ol, 4-hepten-1-ol, 5-decen-1-ol, 5-hexen-1-ol, 5-octen-1-ol, 6-hepten-1-ol, 4-hydroxystyrene, 2-allylphenol, allyl 4-hydroxybenzoate, 1-cyclohexyl-2-buten-1-ol, ethyleneglycol monoallylether, 3-allyloxy-1,2-propanediol, 2-butene-1,4-diol, and 3-hexene-2,5-diol.

Examples of the olefin compound having the hydroxycarbonyl group include 3-butenoic acid, 4-pentenoic acid, 5-hexenoic acid, trans-3-pentenoic acid, vinylbenzoic acid, and trans-3-hexenedioic acid.

Examples of the olefin compound having the carboxylic anhydride group include allylsuccinic anhydride and (2,7-octadien-1-yl)succinic anhydrite.

Examples of the olefin compound having the methacryloyloxy group include cis-1,4-dimethacryloyloxy-2-butene, allyl methacrylate, and 5-hexenyl methacrylate.

Examples of the olefin compound having the epoxy group include 1,3-butadiene monoepoxide, allylglycidyl ether, 1,2-epoxy-5-hexene, 1,2-epoxy-9-decene, and 1,2,9,10-diepoxy-5-decene.

Examples of the olefin compound having the oxysilyl group include alkoxysilane compounds such as vinyl(t-rimethoxy)silane, vinyl(triethoxy)silane, allyl(trimethoxy)silane, allyl(methoxy)(dimethyl)silane, allyl(triethoxy)silane, allyl(ethoxy)(dimethyl)silane, styryl(trimethoxy)silane, styryl(triethoxy)silane, 2-styrylethyl(triethoxy)silane, allyl(triethoxysilylmethyl)ether, and allyl (triethoxysilylmethyl)(ethyl)amine; aryloxysilane compounds such as vinyl(triphenoxy)silane, allyl(triphenoxy)silane and allyl(phenoxy(dimethyl)silane; aryloxysilane compounds such as vinyl(triacetoxy)silane, allyl(triacetoxy)silane, allyl(diacetoxy)methylsilane, and allyl(acetoxy)(dimethyl)silane; alkylsiloxysilane compounds such as allyltris(trimethylsiloxy)silane; arylsiloxysilane compounds such as allyltris(triphenylsiloxy)silane; polysiloxane compounds such as 1-allylheptamethyltrisiloxane, 1-allylnonamethyltetrasiloxane, 1-allylnonamethylcyclopentasiloxane, and 1-allylundecamethylcyclohexasiloxane; alkoxysilane compounds such as 1,4-bis(trimethoxysilyl)-2-butene, 1,4-bis(triethoxysilyl)-2-butene, and 1,4-bis(trimethoxysilylmethoxy)-2-butene; aryloxysilane compounds such as 1,4-bis(triphenoxysilyl)-2-butene; aryloxysilane compounds such as 1,4-bis(triacetoxysilyl)-2-butene; alkylsiloxysilane compounds such as 1,4-bis[tris(trimethylsiloxy)silyl]-2-butene; arylsiloxysilane compounds such as 1,4-bis[tris(triphenylsiloxy)silyl]-2-butene; and polysiloxane compounds such as 1,4-bis(heptamethyltrisiloxy)-2-butene, and 1,4-bis (undecamethylcyclohexasiloxy)-2-butene.

Examples of the olefin compound having the halogen atom include allyl chloride, crotyl chloride, 1,4-dichloro-2-butene, allyl bromide, allyl iodide, crotyl chloride, 1,4-dichloro-2-butene, and 1,4-dibromo-2-butene.

The olefin compounds having the reactive group may be used singly or in combinations of two or more.

The amount of use of the olefin compound having the reactive group is not particularly limited, and may be set in accordance with the ratio of introduction of the reactive group introduced to the polymer chain end of the liquid monocyclic olefin ring-opened polymer (A) and the intended weight-average molecular weight W. The amount of use of the olefin compound having the reactive group is preferably 0.1 to 20 parts by weight, more preferably 0.15 to 15 parts by weight, and still more preferably 0.2 to 10 parts by weight per 100 parts by weight of a monomer containing a monocyclic olefin used for polymerization. The olefin compound having the reactive group has a function of introducing the reactive group to the polymer chain end of the liquid monocyclic olefin ring-opened polymer (A), and also functions as a molecular weight modifier, and thus the amount of use of the olefin compound having the reactive group is preferably within the above range also from the viewpoint of controlling the weight-average molecular weight (Mw) of the liquid monocyclic olefin ring-opened polymer (A) to the above range.

Examples of the ring-opening polymerization catalyst which can be used in a method for subjecting a monomer containing a monocyclic olefin to ring-opening polymerization in the presence of an olefin compound having a reactive group, has resistance to a reactive group, and produces no insoluble component include a ruthenium-carbene complex.

The ruthenium-carbene complex is not particularly limited as long as the complex is a ring-opening polymerization catalyst of a monocyclic olefin. Specific examples of the ruthenium-carbene complex preferably used include bis (tricyclohexylphosphine)benzylideneruthenium dichloride, bis(triphenylphosphine)-3,3-diphenylpropenylideneruthenium dichloride, dichloro-(3-phenyl-1H-inden-1-ylidene) bis(tricyclohexylphosphine)ruthenium(II), (3-phenyl-1H-inden-1-ylidene)bis(tricyclohexylphosphine)ruthenium dichloride, bis(tricyclohexylphosphine)t-butylvinylideneruthenium dichloride, bis(1,3-diisopropylimidazolin-2-ylidene)benzylideneruthenium dichloride, bis(1,3-dicyclohexylimidazolin-2-ylidene)benzylideneruthenium dichloride, (1,3-dimesitylimidazolin-2-ylidene)(tricyclohexylphosphine)benzylideneruthenium dichloride, (1,3-dimesitylimidazolidin-2-ylidene)(tricyclohexylphosphine) benzylidene ruthenium dichloride, bis (tricyclohexylphosphine)ethoxymethylideneruthenium dichloride, and (1,3-dimesitylimidazolidin-2-ylidene)(tricyclohexylphosphine)ethoxymethylidene ruthenium dichloride.

The amount of use of the ruthenium-carbene complex is not particularly limited, and a molar ratio of (metal ruthenium in catalyst:monomer containing monocyclic olefin) is usually 1:2,000 to 1:2,000,000, preferably 1:5,000 to 1:1,500,000, and more preferably 1:10,000 to 1:1,000,000. When the amount of use of the ruthenium-carbene complex is too small, sometimes the polymerization reaction does not sufficiently advance. Meanwhile, when too large, the removal of the catalyst residue from the obtained monocyclic olefin ring-opened polymer becomes difficult, which may cause deterioration in various characteristics as a cross-linked product.

The polymerization reaction may be performed without a solvent or may be performed in a solution. When performing the polymerization in a solution, the solvent used is not particularly limited as long as the solvent is a solvent which is inert in the polymerization reaction and which can dissolve a monomer containing a monocyclic olefin, a polymerization catalyst, and the like used for the polymerization. A hydrocarbon-based solvent, an ether-based solvent, or a halogen-based solvent is preferably used. Examples of the hydrocarbon-based solvent include aromatic hydrocarbons such as benzene, toluene, xylene, and ethylbenzene; aliphatic hydrocarbons such as n-hexane, n-heptane, and n-octane; and alicyclic hydrocarbons such as cyclohexane, cyclopentane, and methylcyclohexane. Examples of the ether-based solvent include diethylether, cyclopentyl methyl ether, 1,2-dimethoxyethylene, and tetrahydrofuran. Examples of the halogen-based solvent include alkylhalogens such as dichloromethane and chloroform; and aromatic halogens such as chlorobenzene and dichlorobenzene.

The polymerization temperature is not particularly limited, and usually set to −50 to 100° C. The polymerization reaction time is preferably 1 minute to 72 hours, and more preferably 5 minutes to 20 hours. After the polymerization conversion rate reaches a predetermined value, a known polymerization terminator can be added to the polymerization system to stop the polymerization reaction.

By doing the above, it is possible to obtain a polymer solution which contains the liquid monocyclic olefin ring-opened polymer (A) having the reactive group at the polymer chain end thereof. As a method for recovering the polymer from the polymer solution, a known recovery method may be employed. For example, the liquid monocyclic olefin ring-opened polymer (A) can be obtained by mixing a polymer solution with a poor solvent of an excessive polymer to precipitate the polymer, recovering the precipitated polymer, and drying the recovered polymer. Alternatively, the liquid monocyclic olefin ring-opened polymer (A) can be obtained by directly drying a polymer solution to evaporate off an unreacted monocyclic olefin and a solvent.

(II) When using a ring-opening polymerization catalyst having no resistance to a reactive group to subject a monomer containing a monocyclic olefin to ring-opening polymerization, the polymerization reaction is performed in the presence of an olefin compound having a reactive group protected by a protective group. Examples of the reactive group to be protected include the same reactive group as the reactive group contained in the olefin compound having a reactive group. The reactive group may be protected by using a protective group known as the protective group of the reactive group. Specific examples of the protective group of the amino group, hydroxyl group, and hydroxycarbonyl group include an alkyl group, an acyl group, an RC(O)— group (R represents a saturated hydrocarbon group having 1-10 carbon atoms), a silyl group, and metal alkoxide. The olefin compound may have a reactive group protected by reacting an olefin compound having an amino group, a hydroxyl group, or a hydroxycarbonyl group with a trialkyl aluminum compound. When using the reaction product between the olefin compound having an amino group, a hydroxyl group, or a hydroxycarbonyl group and the trialkyl aluminum compound, the reaction product can function as an organometallic compound used as a catalytic promoter described below. Meanwhile, a protective group suitable for protecting a methacryloyloxy group, a carboxylic anhydride group, and an epoxy group is not present, and thus when the liquid monocyclic olefin ring-opened polymer (A) has a methacryloyloxy group, a carboxylic anhydride group, or an epoxy group at a polymer chain end thereof, the liquid monocyclic olefin ring-opened polymer (A) is preferably produced by the method of (I). The olefin compound having an oxysilyl group and the olefin compound having a halogen atom have resistance to also a polymerization catalyst described below other than (I), and thus the olefin compounds require no protective group.

The ring-opening polymerization catalyst having no resistance to a reactive group and producing no insoluble component in the presence of an olefin compound having a reactive group protected by a protective group is not limited as long as the ring-opening polymerization catalyst can subject a monomer containing a monocyclic olefin to ring-opening polymerization. Examples of the ring-opening polymerization catalyst preferably used include a molybdenum compound and a tungsten compound. Specific examples of the molybdenum compound which can be used as the ring-opening polymerization catalyst include molybdenum pentachloride, molybdenum oxotetrachloride, and molybdenum(phenylimide)tetrachloride. Specific examples of the tungsten compound include tungsten hexachloride, tungsten oxotetrachloride, tungsten(phenylimide)tetrachloride, monocatecholate tungsten tetrachloride, bis(3,5-ditertiary butyl)catecholate tungsten dichloride, bis(2-chloroethelate)tetrachloride, and tungsten oxotetraphenolate.

When using the molybdenum compound or the tungsten compound as the ring-opening polymerization catalyst, an organometallic compound can be used as a catalytic promoter in combination. Examples of the organometallic compounds which can be used as the catalytic promoter include organometallic compounds of metal atoms of Group I, II, XII, XIII, or XIV of the Periodic Table having hydrocarbon groups having 1-20 carbon atoms. Among these, an organolithium compound, an organomagnesium compound, an organozinc compound, an organoaluminum compound, and an organotin compound are preferably used; an organolithium compound, an organotin compound, and an organoaluminum compound are more preferably used; and an organoaluminum compound is particularly preferably used. The amount of use of the organometallic compound is not particularly limited, and the molar ratio of (molybdenum compound or tungsten compound:organometallic compound) is preferably 1:0.1 to 10, and more preferably 1:0.5 to 5.

The polymerization reaction conditions and the like in the case of using a molybdenum compound or a tungsten compound as a ring-opening polymerization catalyst may be suitably set in the range of the conditions described in the case of using the ruthenium-carbene complex.

The liquid monocyclic olefin ring-opened polymer having an amino group, a hydroxyl group, or a hydroxycarbonyl group protected by the protective group at a polymer chain end thereof, obtained as above may be deprotected by known techniques in accordance with the used protective group. Specific methods thereof include a deprotection method in accordance with heating and a deprotection method in accordance with hydrolysis or alcoholysis.

As described above, the polymer solution containing the liquid monocyclic olefin ring-opened polymer (A) having a reactive group at a polymer chain end thereof can be obtained. The known recovery method described when the ruthenium-carbene complex is used may be employed as the method for recovering the polymer from the polymer solution.

(III) Known methods can be used for the method for converting the specific functional group at the polymer chain end synthesized in the above (I) or (II) into another specific functional group. For example, by reacting the liquid monocyclic olefin ring-opened polymer having a hydroxyl group at a polymer chain end thereof with an isocyanate compound having an oxysilyl group, the liquid monocyclic olefin ring-opened polymer (A) having an oxysilyl group at a polymer chain end thereof may be obtained. Examples of the isocyanate compound having an oxysilyl group include 3-(trimethoxysilyl)propyl isocyanate, 3-(triethoxysilyl)propyl isocyanate, and 3-(methyidimethoxysilyl)propyl isocyanate.

By the above producing methods, the liquid monocyclic olefin ring-opened polymer (A) used in the present invention can be obtained. To the obtained liquid monocyclic olefin ring-opened polymer (A), an antiaging agent such as a phenol-based stabilizer, a phosphorus-based stabilizer, or a sulfur-based stabilizer may be added as desired. The amount of the antiaging agent added may be suitably determined in accordance with the kind and the like. Furthermore, as desired, an extender oil may also be blended.

<Crosslinkable Compound (B)>

A crosslinkable composition of the present invention contains, in addition to the liquid monocyclic olefin ring-opened polymer (A), a crosslinkable compound (B) having, in the molecule, two or more functional groups reactive with the reactive group at the polymer chain end of the liquid monocyclic olefin ring-opened polymer W.

The functional group (hereafter, referred to as a "specific functional group") reactive with the reactive group at the polymer chain end of the liquid monocyclic olefin ring-opened polymer (A) contained in the crosslinkable compound (B) is not particularly limited, and may correspond to the reactive group contained at the polymer chain end of the liquid monocyclic olefin ring-opened polymer W.

Specifically, when the reactive group of the liquid monocyclic olefin ring-opened polymer (A) is an amino group, the specific functional group of the crosslinkable compound (B) may be an epoxy group, for example.

When the reactive group of the liquid monocyclic olefin ring-opened polymer (A) is a hydroxyl group or a hydroxycarbonyl group, the specific functional group of the crosslinkable compound (B) may be an isocyanate group, an epoxy group, or an amino group, for example.

When the reactive group of the liquid monocyclic olefin ring-opened polymer (A) is a carboxylic anhydride group, the specific functional group of the crosslinkable compound (B) may be an epoxy group or an amino group, for example.

When the reactive group of the liquid monocyclic olefin ring-opened polymer (A) is a methacryloyloxy group, the specific functional group of the crosslinkable compound (B) may be an acryloyloxy group or a methacryloyloxy group, for example.

When the reactive group of the liquid monocyclic olefin ring-opened polymer (A) is an epoxy group, the specific functional group of the crosslinkable compound (B) may be an amino group, for example.

When the reactive group of the liquid monocyclic olefin ring-opened polymer (A) is an oxysilyl group, the specific functional group of the crosslinkable compound (B) may be an oxysilyl group, an amino group, or an epoxy group, for example.

When the reactive group of the liquid monocyclic olefin ring-opened polymer (A) is a halogen atom, the specific functional group of the crosslinkable compound (B) may be an amino group, for example.

Examples of the crosslinkable compound (B) in which the specific functional group is an epoxy group include a bisphenol A epoxy resin, a bisphenol F epoxy resin, a bisphenol AD epoxy resin, polyglycidyl ether of polyhydric alcohol, polyglycidyl ester of polybasic acid, 3,4-epoxycyclohexyl-3',4'-epoxycyclohexanecarboxylate, vinylcyclohexene diepoxide, and a cresol novolac epoxy resin.

Examples of the crosslinkable compound (B) in which the specific functional group is an isocyanate group include aliphatic isocyanate compounds such as hexamethylene diisocyanate and lysine diisocyanate; aromatic isocyanate compounds such as p-phenylene diisocyanate, tolylene diisocyanate (TDI), naphthylene diisocyanate (NDI), tolidine diisocyanate (TODI), 4,4'-diphenylmethane diisocyanate (MDI), and polymeric MDI; aromatic aliphatic isocyanate compounds such as xylylene diisocyanate (XDI) and tetramethylxylylene diisocyanate (TMXDI); and alicyclic isocyanate compounds such as cyclohexyl diisocyanate (CHPI), hydrogenated xylylene diisocyanate (hydrogenated XDI), isophorone diisocyanate (IPDI), and dicyclohexylmethane diisocyanate (HMDI).

Examples of the crosslinkable compound (B) in which the specific functional group is an amino group include 3,3'-diethyl-4,4'-diaminophenylmethane, 3,3',5,5'-tetramethyl-4,4'-diaminophenylmethane, and 3,3',5,5'-tetraethyl-4,4'-diaminophenylmethane, 2,4-diaminotoluene, 1,4-diaminobenzene, 1,3-diaminobenzene, triethyl tetraamine, and 2,4,6-tris(dimethylaminomethyl)phenol.

Examples of the crosslinkable compound (B) in which the specific functional group is an acryloyloxy group or a methacryloyloxy group include pentaerythritol tetraacrylate, dipentaerythritol pentaacrylate, dipentaerythritol hexaacrylate, dimethylolpropane tetraacrylate, ethoxylated pentaerythritol tetracrylate, ditrimethylolpropane tetraacrylate, and trimethylolpropane trimethacrylate.

Examples of the crosslinkable compound (B) in which the specific functional group is an oxysilyl group include tetraalkoxysilanes such as tetramethoxysilane, tetraethoxysilane, tetra-n-propoxysilane, tetra-i-propoxysilane, and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, 3-aminopropyltriethoxysilane, N-2-(aminoethyl)-3-aminopropyltrimethoxysilane, and N-phenyl-3-aminopropyltrimethoxysilane; and dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, and di-n-butyldimethoxysilane.

These crosslinkable compounds (B) may be used singly or in combinations of two or more. Naturally, the crosslinkable compounds (B) in which specific functional groups are different may be used in combinations of two or more. For example, when the reactive group of the liquid monocyclic olefin ring-opened polymer (A) is an oxysilyl group, three crosslinkable compounds (B), i.e., a crosslinkable compound (B) having an oxysilyl group as the specific functional group, a crosslinkable compound (B) having an amino group as the specific functional group, and a crosslinkable compound (B) having an epoxy group as the specific functional group may be used in combinations.

The crosslinkable compound (B) may have two or more specific functional groups in the molecule, and from the viewpoint of reactivity with the reactive group contained at the polymer chain end of the liquid monocyclic olefin ring-opened polymer (A), the crosslinkable compound (B) more preferably contains three or more specific functional groups in the molecule. When the crosslinkable compounds (B) are used in combinations of two or more, at least one crosslinkable compound (B) containing three or more specific functional groups in the molecule is preferably used.

The content of the crosslinkable compound (B) in the crosslinkable composition of the present invention is preferably 1 to 200 parts by weight, more preferably 2 to 150 parts by weight, and still more preferably 2 to 100 parts by weight per 100 parts by weight of the liquid monocyclic olefin ring-opened polymer W. By setting the content of the crosslinkable compound (B) to the above range, the crosslinked product having higher tensile strength and more excellent heat resistance and ozone resistance can be provided.

<Crosslinkable Composition>

The crosslinkable composition of the present invention can be produced by mixing the liquid monocyclic olefin ring-opened polymer (A) with the crosslinkable compound (B). The mixing method is not particularly limited, and known methods can be used without restriction. The mixing may be performed in a solvent. Examples of the solvent to be used include, but are not particularly limited to, ethers such as tetrahydrofuran and anisole; esters such as ethyl acetate and ethyl benzoate; ketones such as acetone, 2-butanone, and acetophenone; aprotic polar solvents such as acetonitrile, dimethylformamide, dimethylacetamide, dimethyl sulfoxide, and N-methylpyrrolidone; and protic polar solvents such as ethanol, methanol, and water. These solvents may be used singly or as a mixed solvent of two or more.

The crosslinkable composition of the present invention may contain, in addition to the liquid monocyclic olefin ring-opened polymer (A) and the crosslinkable compound (B), other components. Specific examples of the other components include a crosslinking promoter, a crosslinking activating agent, a filler, an antiaging agent, an activator, process oil, a plasticizer, and wax.

The crosslinking promoter may be suitably selected and used in accordance with the kinds of the reactive group contained at the polymer chain end of the liquid monocyclic olefin ring-opened polymer (A) and the specific functional group of the crosslinkable compound (B).

For example, when the reactive group of the liquid monocyclic olefin ring-opened polymer (A) is a hydroxyl group, and the crosslinkable compound (B) in which the specific functional group is an isocyanate group is used, there can be used, as the crosslinking promoter, metal catalysts such as an organotin compound (dibutyltin dilaurate, dioctyltin dilaurate, and the like) and a bismuth compound; a base catalyst such as organic amine; and urethane reaction catalysts such as a DMC catalyst; and the like.

When the reactive group of the liquid monocyclic olefin ring-opened polymer (A) is an oxysilyl group, and the crosslinkable compound (B) in which the specific functional group is an oxysilyl group is used, there can be used, as the crosslinking promoter, phosphites such as triphenyl phosphite and tributyl phosphite.

When the reactive group of the liquid monocyclic olefin ring-opened polymer (A) is a methacryloyloxy group, and the crosslinkable compound (B) in which the specific functional group is an acryloyloxy group or a methacryloyloxy group is used, there can be used, as the crosslinking promoter, radical generators such as azobisisobutyronitrile, t-amyl peroxypivalate, t-butyl peroxyacetate, t-butyl peroxyisobuthylate, t-butyl peroxypivalate, t-butyl peroxyoctoate, t-butyl peroxy-2-ethylhexanoate, t-butyl peroxyneodecanoate, t-aminoperoxyneodecanoate, t-aminoperoxyoctoate, t-aminoperoxy-2-ethylhexanoate, t-butyl peroxybenzoate, benzoyl peroxide, lauroyl peroxide, isobutyryl peroxide, succinic peroxide, di-tert-butyl peroxide, isobutyl peroxide, 2,2'-azobis-2,4-dimethylvaleronitrile, 2,2'-azobis-(4-methoxy-2,4-dimethylvaleronitrile), and 2,2'-azobis-2-methylbutyronitrile.

Furthermore, when the reactive group of the liquid monocyclic olefin ring-opened polymer (A) is a hydroxycarbonyl group, and the crosslinkable compound (B) in which the specific functional group is an epoxy group, and the crosslinkable compound (B) in which the specific functional group is an amino group are used, there can be used, as the crosslinking promoter, imidazoles such as 2-ethylimidazole, 2-ethyl-4-methylimidazole, bis-2-ethyl-4-methylimidzole, 1-methyl-2-ethylimidazole, 2-isopropylimidazole, 2,4-dimethylimidazole, 2-heptadecylimidazole, 2-phenylimidazole, 2-phenyl-4-methylimidazole, 1-benzyl-2-methylimidazole, 1-benzyl-2-ethylimidazole, 1-benzyl-2-phenylimidazole, benzimidazole, and 2-ethyl-4-methyl-1-(2'-cyanoethyl)imidazole.

The amount of the crosslinking promoter blended is preferably 0.01 to 10 parts by weight, and more preferably 0.02 to 5 parts by weight per 100 parts by weight of the liquid monocyclic olefin ring-opened polymer (A).

<Crosslinked Product>

A crosslinked product of the present invention is obtained by crosslinking the crosslinkable composition of the present invention. Specifically, the crosslinked product is obtained by reacting the reactive group contained at the polymer chain end of the liquid monocyclic olefin ring-opened polymer (A) with the specific functional group of the crosslinkable compound (B).

The method for crosslinking the crosslinkable composition of the present invention is not particularly limited, and may be selected in accordance with the kinds of the reactive group contained at the polymer chain end of the liquid monocyclic olefin ring-opened polymer (A) and the specific functional group of the crosslinkable compound (B). Examples thereof include crosslinking by heat or ultraviolet irradiation. The crosslinking temperature for crosslinking by heating is not particularly limited, and preferably 40 to 250° C., and more preferably 50 to 200° C. The crosslinking time is also not particularly limited, and is selected, for example, within the range of 1 minute to 5 hours. As the heating method, methods such as press heating, oven heating, steam heating, hot air heating, and microwave heating may be suitably selected. On crosslinking by ultraviolet irradiation, the crosslinkable composition may be irradiated with ultraviolet rays in accordance with ordinary methods using a light source such as a high pressure mercury lamp, a metal halide lamp, or a mercury-xenon lamp.

The present invention provides the crosslinkable composition and the crosslinked product mentioned above.

In particular, in the crosslinkable composition of the present invention, the liquid monocyclic olefin ring-opened polymer (A) is used, and thus the crosslinkable composition has good fluidity at room temperature (25° C.). When the crosslinked product is provided from the crosslinkable composition, the crosslinked product having high tensile strength and excellent heat resistance and ozone resistance can be achieved. Therefore, the crosslinkable composition and crosslinked product of the present invention can be suitably used in an application in which fluidity is required before crosslinking, and an application in which the crosslinkable composition having fluidity is suitable before crosslinking, and heat resistance and ozone resistance are required. Since the crosslinked product of the present invention has rubber elasticity, the crosslinked product can be suitably used also for an application in which elasticity is required. Specifically, the crosslinked product can be suitably used as an adhesive, a seal material, a coating agent, and a paint used in building and civil engineering fields, automobile and electronic appliance fields, and air and space fields. Furthermore, the crosslinked product can be suitably used as an electric insulating coating material for an electric wire and a connector and the like used in the automobile and electronic appliance fields. In particular, since the crosslinkable composition of the present invention has good fluidity at room temperature (25° C.), the crosslinkable composition can be applied to substrates having various shapes taking advantage of such fluidity, to use the substrates. Therefore, the crosslinkable composition can be particularly suitably used for these applications.

EXAMPLES

Hereinafter, the present invention will be described based on more detailed Examples, but the present invention is not limited to these Examples. Hereinafter, "parts" are based on weight unless otherwise indicated. Various tests and evaluations were performed in accordance with the following methods.

Weight-Average Molecular Weight (Mw) and Number Average Molecular Weight (Mn) of Liquid Monocyclic Olefin Ring-Opened Polymer Using gel permeation chromatography (GPC) system HLC-8220 (manufactured by Tosoh Corporation) with tetrahydrofuran as a solvent and two H-type columns HZ-M (manufactured by Tosoh Corporation) connected in series, the number average molecular weight (Mn) and weight average molecular weight (Mw) of the liquid monocyclic olefin ring-opened polymer were measured at a column temperature of 40° C. A differential refractometer "RI-8320" (manufactured by Tosoh Corporation) was used as a detector. The weight-average molecular weight (Mw) and number average molecular weight (Mn) of the liquid monocyclic olefin ring-opened polymer were measured as values converted to polystyrene.

Glass Transition Temperature (Tg) and Melting Point (Tm) of Liquid Monocyclic Olefin Ring-Opened Polymer Measurement was performed at a temperature increase rate of 10° C./min within a temperature range of from −150° C. to 40° C. using a differential scanning calorimeter (DSC, product name: "X-DSC7000", manufactured by Hitachi High-Tech Science Corporation).

Monomer Unit Composition Ratio in Liquid Monocyclic Olefin Ring-Opened Polymer

A monomer unit composition ratio in the liquid monocyclic olefin ring-opened polymer was determined from $^1$H-NMR spectrometry.

Melt Viscosity of Liquid Monocyclic Olefin Ring-Opened Polymer

A melt viscosity at 25° C. was measured by a Brookfield viscometer DV-II+Pro (manufactured by Brookfield Corporation). A shear rate during measurement was adjusted within the range of from 1.2 to 10 sec$^{-1}$ according to the viscosity.

Ratio of Introduction of Reactive Group at Polymer Chain End of Liquid Monocyclic Olefin Ring-Opened Polymer A liquid monocyclic olefin ring-opened polymer was dissolved in deuteriochloroform, and the deuteriochloroform solution in which the liquid monocyclic olefin ring-opened polymer was dissolved was subjected to $^1$H-NMR spectrometry, to measure the ratio of a peak integral value peculiar to a reactive group and a peak integral value derived from an olefin. The ratio of introduction of the reactive group at the polymer chain end was calculated based on the ratio of the measured peak integral values and the measurement results of the number average molecular weight (Mn) by GPC. The ratio of introduction of the reactive group at the polymer chain end was taken as the rate of the number of reactive groups to the number of liquid monocyclic olefin ring-opened polymer chains. That is, the ratio of introduction of the reactive group:100% represents a state where a reactive group is introduced to the liquid monocyclic olefin ring-opened polymer chain of one molecule. The ratio of introduction of the reactive group:200% represents a state where a reactive group is introduced to each of both ends of the liquid monocyclic olefin ring-opened polymer chain of one molecule.

Tensile Strength of Crosslinked Product

A dumbbell test piece was obtained by punching out a crosslinked product sheet in a No. 6 dumbbell shape in parallel to a grain direction. The obtained dumbbell test piece was subjected to a tensile test under conditions of 23° C. and 500 mm/min based on JIS K6251 using a tensile test machine (product name: "TENSOMETER10K", manufactured by ALPHA TECHNOLOGIES) as a test machine, to measure tensile strength $S_0$.

Change Rate in Tensile Strength Before and After Heat Treatment of Crosslinked Product A dumbbell test piece was obtained in the same manner as in the tensile test, and the obtained dumbbell test piece was heat-treated under conditions of 100° C. and 72 hours in a Geer's Aging Oven (product name: "AG-1110", manufactured by Ueshima Seisakusho Co., Ltd.), to obtain the heat-treated test piece. The heat-treated test piece was subjected to a tensile test in the same manner as in the tensile test, to measure tensile strength $S_1$ of the heat-treated test piece. From the obtained measurement results, a change rate ΔS of the tensile strength before and after a heat treatment was calculated in accordance with the following formula. As the absolute value of the change rate ΔS of the tensile strength before and after a heat treatment is smaller, the variation in the tensile strength caused by the heat treatment is smaller, which is preferable.

Change rate ΔS (%) of tensile strength before and after heat treatment={(tensile strength $S_1$(MPa) after heat treatment−tensile strength $S_0$ (MPa) before heat treatment/tensile strength $S_0$ (MPa) before heat treatment}×100

Static Ozone Strain Testing

A dumbbell test piece was obtained by punching out a crosslinked product sheet in a No. 1 dumbbell shape. The dumbbell test piece was subjected to static ozone strain testing under conditions of a test temperature of 40° C., an ozone concentration of 50 pphm, tensile distortion of 20%, and a test time of 24 hours in accordance with JIS K6259 in an ozone weather meter (product name: "OMS-HN", manufactured by Suga Test Instruments Co., Ltd.). The ozone resistance of the test piece after the static ozone strain testing was evaluated by observing the sizes of the cracks of the test piece according to the crack state observation method in accordance with JIS K 6259.

The sizes of the cracks of the test piece were evaluated according to the following criteria.

1: Cracks are not visible by the naked eye, but can be confirmed by magnifier of 10 magnifications.
2: Cracks are visible by the naked eye.
3: Cracks are deep and relatively large (less than 1 mm).
4: Cracks are deep and large (1 mm or more and less than 3 mm).
5: Cracks of 3 mm or more are present, or cutting is likely to occur.

Synthetic Example 1

Synthesis of Liquid Monocyclic Olefin Ring-Opened Polymer Having Hydroxyl Group at Each of Both Ends (A-1)

Under a nitrogen atmosphere, a pressure resistant glass reaction vessel in which a magnetic stirrer was placed was charged with 1000 parts of cyclopentene, 28.2 parts of cis-2-butene-1,4-diol, and 990 parts of tetrahydrofuran. Then, this was charged with 0.068 parts of dichloro-(3-phenyl-1H-inden-1-ylidene)bis(tricyclohexylphosphine)ruthenium (II) dissolved in 10 parts of tetrahydrofuran to cause the polymerization reaction at room temperature for 3 hours. After the polymerization reaction for 3 hours, an excess of vinylethylether was added to stop the polymerization, and a large quantity of methanol was then added to precipitate a polymer. Then, the supernatant solution was removed to recover the precipitated product. The solvent remaining in the recovered precipitated product was then removed by an evaporator, and then vacuum-dried at 50° C. for 24 hours, to obtain 700 parts of a liquid monocyclic olefin ring-opened polymer having a hydroxyl group at each of both ends (A-1). The obtained liquid monocyclic olefin ring-opened polymer having a hydroxyl group at each of both ends (A-1) had Mw: 7,100, Mn: 4,600, an end reactive group introduction ratio: 200%, Tg: −92° C., and Tm: 23° C. The liquid monocyclic olefin ring-opened polymer had a melt viscosity measured at 25° C.: 12 Pa·s.

Synthetic Example 2

Synthesis of Liquid Monocyclic Olefin Ring-opened polymer Having Hydroxyl Group at Each of Both Ends (A-2)

750 parts of a liquid monocyclic olefin ring-opened polymer having a hydroxyl group at each of both ends (A-2) was obtained in the same manner as in Synthetic Example 1 except that the amount of use of cyclopentene was changed to 850 parts from 1000 parts, and 150 parts of dicyclopentadiene was further used. The obtained liquid monocyclic olefin ring-opened polymer having a hydroxyl group at each of both ends (A-2) had Mw: 7,700, Mn: 4,200, a content rate of a monomer unit derived from cyclopentene in the monocyclic olefin ring-opened polymer: 92 mol %, a content rate of a monomer unit derived from dicyclopentadiene: 8 mol %, an end reactive group introduction ratio: 200%, and Tg: −81° C. Tm was not observed. The liquid monocyclic olefin ring-opened polymer had a melt viscosity measured at 25° C.: 75 Pa·s.

Synthetic Example 3

Synthesis of Liquid Monocyclic Olefin Ring-Opened Polymer Having Hydroxyl Group at Each of Both Ends (A-3)

850 parts of a liquid monocyclic olefin ring-opened polymer having a hydroxyl group at each of both ends (A-3)

was obtained in the same manner as in Synthetic Example 1 except that 1000 parts of cyclooctadiene was used in place of 1000 parts of cyclopentene. The obtained liquid monocyclic olefin ring-opened polymer having a hydroxyl group at each of both ends (A-3) had Mw: 11,000, Mn: 6,500, an end reactive group introduction ratio: 200%, and Tg: −104° C. Tm was not observed. The liquid monocyclic olefin ring-opened polymer had a melt viscosity measured at 25° C.: 20 Pa·s.

Synthetic Example 4

Synthesis of Liquid Monocyclic Olefin Ring-Opened Polymer Having Triethoxysilyl Group at Each of Both Ends (A-4)

A glass reaction vessel was charged with 100 parts of the liquid monocyclic olefin ring-opened polymer having a hydroxyl group at each of both ends (A-1), obtained in Synthetic Example 1, and 217 parts of toluene, to dissolve the liquid monocyclic olefin ring-opened polymer having a hydroxyl group at each of both ends (A-1) in toluene. Then, to the solution, 12.8 parts of 3-(triethoxysilyl)propyl isocyanate and 3.3 parts of dibutyltin dilaurate were added to cause the reaction at 60° C. for 4 hours. After the polymerization reaction for 4 hours, a large quantity of ethanol was added to precipitate a polymer. Then, the supernatant solution was removed to recover the precipitated product. The solvent remaining in the recovered precipitated product was then removed by an evaporator, and then vacuum-dried at 50° C. for 24 hours, to obtain 100 parts of a liquid monocyclic olefin ring-opened polymer having a triethoxysilyl group at each of both ends (A-4). The obtained liquid monocyclic olefin ring-opened polymer having a triethoxysilyl group at each of both ends (A-4) had Mw: 17,200, Mn: 11,600, an end reactive group introduction ratio: 198%, Tg: −90° C., and Tm: 20° C. The liquid monocyclic olefin ring-opened polymer had a melt viscosity measured at 25° C.: 35 Pa·s.

Synthetic Example 5

Synthesis of Liquid Monocyclic Olefin Ring-Opened Polymer Having Methacryloyloxy Group at Each of Both Ends (A-5)

A liquid monocyclic olefin ring-opened polymer having a methacryloyloxy group at each of both ends (A-5) was obtained in the same manner as in Synthetic Example 1 except that 72.8 parts of cis-1,4-dimethacryloyloxy-2-butene was used in place of 28.2 parts of cis-2-butene-1,4-diol in Synthetic Example 1. The obtained liquid monocyclic olefin ring-opened polymer having a methacryloyloxy group at each of both ends (A-5) had Mw: 22,500, Mn: 12,600, an end reactive group introduction ratio: 192%, Tg: −89° C., and Tm: 18° C. The liquid monocyclic olefin ring-opened polymer had a melt viscosity measured at 25° C.: 58 Pa·s.

Synthetic Example 6

Synthesis of Liquid Monocyclic Olefin Ring-Opened Polymer Having Hydroxycarbonyl Group at Each of Both Ends (A-6)

A liquid monocyclic olefin ring-opened polymer having a hydroxycarbonyl group at each of both ends (A-6) was obtained in the same manner as in Synthetic Example 1 except that 72.3 parts of trans-3-hexenedioic acid was used in place of 28.2 parts of cis-2-butene-1,4-diol in Synthetic Example 1. The obtained liquid monocyclic olefin ring-opened polymer having a hydroxycarbonyl group at each of both ends (A-6) had Mw: 13,400, Mn: 7,300, an end reactive group introduction ratio: 200%, Tg: −91° C., and Tm: 19° C. The liquid monocyclic olefin ring-opened polymer had a melt viscosity measured at 25° C.: 25 Pa·s.

Synthetic Example 7

Synthesis of Liquid Monocyclic Olefin Ring-Opened Polymer Having No Reactive Group at Each of Ends (A'-7)

A liquid monocyclic olefin ring-opened polymer having no reactive group at each of ends (A'-7) was obtained in the same manner as in Synthetic Example 1 except that 21.5 parts of 1-hexene was used in place of 28.2 parts of cis-2-butene-1,4-diol in Synthetic Example 1. The obtained liquid monocyclic olefin ring-opened polymer having no reactive group at each of ends (A'-7) had Mw: 13,200, Mn: 7,700, Tg: −93° C., and Tm: 23° C. The liquid monocyclic olefin ring-opened polymer had a melt viscosity measured at 25° C.: 11 Pa·s.

Example 1

A crosslinkable composition was obtained by mixing 100 parts of the liquid monocyclic olefin ring-opened polymer having a hydroxyl group at each of both ends (A-1), obtained in Synthetic Example 1 with 12 parts of polymeric MDI (trade name: "LUPRANATE M20S", manufactured by BASF INOAC Polyurethanes Ltd.) and 0.05 parts of dibutyltin dilaurate. A crosslinked product sheet having a thickness of 1 mm was obtained by casting the obtained crosslinkable composition into a mold (mold having a hollow having a depth of 1 mm) made of a fluorine resin, and heating the crosslinkable composition at 120° C. for 1 hour for the crosslinking reaction. In accordance with the above method, the obtained crosslinked product sheet was subjected to measurements of tensile strength and a change rate in tensile strength before and after a heat treatment, and static ozone strain testing. The results are shown in Table 1.

Example 2

A crosslinkable composition and a crosslinked product sheet were obtained in the same manner as in Example 1 except that 100 parts of the liquid monocyclic olefin ring-opened polymer (A-2) having a hydroxyl group at each of both ends, obtained in Synthetic Example 2 was used in place of 100 parts of the liquid monocyclic olefin ring-opened polymer having a hydroxyl group at each of both ends (A-1), and evaluated in the same manner as in Example 1. The results are shown in Table 1.

Example 3

A crosslinkable composition and a crosslinked product sheet were obtained in the same manner as in Example 1 except that 100 parts of the liquid monocyclic olefin ring-opened polymer (A-3) having a hydroxyl group at each of both ends, obtained in Synthetic Example 3 was used in place of 100 parts of the liquid monocyclic olefin ring-opened polymer having a hydroxyl group at each of both ends (A-1), and evaluated in the same manner as in Example 1. The results are shown in Table 1.

Example 4

A crosslinkable composition was obtained by mixing 100 parts of the liquid monocyclic olefin ring-opened polymer having a triethoxysilyl group at each of both ends (A-4), obtained in Synthetic Example 4 with 20 parts of methyl trimetoxysilane (trade name: "KBM-13", manufactured by Shin-Etsu Chemical Co., Ltd.) and 0.5 parts of tributyl phosphite. A crosslinked product sheet having a thickness of 1 mm was obtained by casting the obtained crosslinkable composition into a mold (mold having a hollow having a depth of 1 mm) made of a fluorine resin, and heating the crosslinkable composition at 100° C. for 1 hour for the crosslinking reaction. The obtained crosslinked product sheet was evaluated in the same manner as in Example 1. The results are shown in Table 1.

Example 5

A crosslinkable composition was obtained by mixing 100 parts of the liquid monocyclic olefin ring-opened polymer having a triethoxysilyl group at each of both ends (A-4), obtained in Synthetic Example 4 with 5 parts of 2,4,6-tris(dimethylaminomethyl)phenol (manufactured by Kayaku Akzo Corporation), 2 parts of N-(2-aminoethyl)-3-aminopropyltrimethoxysilane (trade name: "A-1120", manufactured by Momentive Performance Materials Inc.), 50 parts of a bisphenol A liquid epoxy resin (trade name: "Epicoat 828", manufactured by Mitsubishi Chemical Corporation), and 0.5 parts of tributyl phosphite. A crosslinked product sheet having a thickness of 1 mm was obtained by casting the obtained crosslinkable composition into a mold (mold having a hollow having a depth of 1 mm) made of a fluorine resin, and heating the crosslinkable composition at 100° C. for 1 hour for the crosslinking reaction. The obtained crosslinked product sheet was evaluated in the same manner as in Example 1. The results are shown in Table 1.

Example 6

A crosslinkable composition was obtained by mixing 100 parts of the liquid monocyclic olefin ring-opened polymer having a methacryloyloxy group at each of both ends (A-5), obtained in Synthetic Example 5 with 5 parts of pentaerythritol tetraacrylate and 2 parts of t-aminoperoxy-2-ethylhexanoate. A crosslinked product sheet having a thickness of 1 mm was obtained by casting the obtained crosslinkable composition into a mold (mold having a hollow having a depth of 1 mm) made of a fluorine resin, and heating the crosslinkable composition at 160° C. for 30 minutes for the crosslinking reaction. The obtained crosslinked product sheet was evaluated in the same manner as in Example 1. The results are shown in Table 1.

Example 7

A crosslinkable composition was obtained by mixing 100 parts of the liquid monocyclic olefin ring-opened polymer having a hydroxycarbonyl group at each of both ends (A-6), obtained in Synthetic Example 6 with 50 parts of a bisphenol F liquid epoxy resin (trade name: "YDF-8170C", manufactured by Toto Kasei Co., Ltd.), 20 parts of 3,3'-diethyl-4,4'-diaminodiphenylmethane (trade name: "KAYAHARD A-A", manufactured by Nippon Kayaku Co., Ltd.), and 1 part of 2-ethyl-4-methylimidazole. A crosslinked product sheet having a thickness of 1 mm was obtained by casting the obtained crosslinkable composition into a mold (mold having a hollow having a depth of 1 mm) made of a fluorine resin, and heating the crosslinkable composition at 150° C. for 1 hour for the crosslinking reaction. The obtained crosslinked product sheet was evaluated in the same manner as in Example 1. The results are shown in Table 1.

Comparative Example 1

A crosslinkable composition and a crosslinked product sheet were obtained in the same manner as in Example 1 except that 100 parts of liquid polybutadiene having a hydroxyl group at each of both ends (A'-8) (trade name: Krasol LBH-P3000, manufactured by Cray Valley) was used in place of 100 parts of the liquid monocyclic olefin ring-opened polymer having a hydroxyl group at each of both ends (A-1), and evaluated in the same manner as in Example 1. The results are shown in Table 1.

Comparative Example 2

When the same manipulation as that in Example 1 was performed except that the liquid monocyclic olefin ring-opened polymer having no reactive group at each of ends (A'-7), obtained in Synthetic Example 7 was used in place of 100 parts of the liquid monocyclic olefin ring-opened polymer having a hydroxyl group at each of both ends (A-1), the crosslinking reaction did not advance, and the monocyclic olefin ring-opened polymer was still in a liquid form. Therefore, a crosslinked product sheet could not be obtained in Comparative Example 2.

TABLE 1

|  |  |  | Examples | | | | |
| --- | --- | --- | --- | --- | --- | --- | --- |
|  |  |  | 1 | 2 | 3 | 4 | 5 |
| Liquid polymers | Liquid monocyclic olefin ring-opened polymer having hydroxyl group at each of both ends (A-1) | (parts) | 100 | — | — | — | — |
|  | Liquid monocyclic olefin ring-opened polymer having hydroxyl group at each of both ends (A-2) | (parts) | — | 100 | — | — | — |
|  | Liquid monocyclic olefin ring-opened polymer having hydroxyl group at each of both ends (A-3) | (parts) | — | — | 100 | — | — |
|  | Liquid monocyclic olefin ring-opened polymer having triethoxysilyl group at each of both ends (A-4) | (parts) | — | — | — | 100 | 100 |
|  | Liquid monocyclic olefin ring-opened polymer having methacryloyloxy group at each of both ends (A-5) | (parts) | — | — | — | — | — |

TABLE 1-continued

|  |  |  | | | | | |
|---|---|---|---|---|---|---|---|
|  | Liquid monocyclic olefin ring-opened polymer having hydroxycarbonyl group at each of both ends (A-6) | (parts) | — | — | — | — | — |
|  | Liquid monocyclic olefin ring-opened polymer having no reactive group at each of ends (A'-7) | (parts) | — | — | — | — | — |
|  | Liquid polybutadiene having hydroxyl group at each of both ends (A'-8) | (parts) | — | — | — | — | — |
| Crosslinkable compounds | Polymeric MDI | (parts) | 12 | 12 | 12 | — | — |
|  | Methyltrimethoxysilane | (parts) | — | — | — | 20 | — |
|  | 2,4,6-tris(dimethylaminomethyl)phenol | (parts) | — | — | — | — | 5 |
|  | N-(2-aminoethyl)-3-aminopropyltrimethoxysilane | (parts) | — | — | — | — | 2 |
|  | Bisphenol A liquid epoxy resin | (parts) | — | — | — | — | 50 |
|  | Pentaerythritol tetraacrylate | (parts) | — | — | — | — | — |
|  | Bisphenol F liquid epoxy resin | (parts) | — | — | — | — | — |
|  | 3,3'-diethyl-4,4'-diaminodiphenylmethane | (parts) | — | — | — | — | — |
| Crosslinking promoters | Dibutyltin dilaurate | (parts) | 0.05 | 0.05 | 0.05 | — | — |
|  | Tributyl phosphite | (parts) | — | — | — | 0.5 | 0.5 |
|  | t-aminoperoxy-2-ethylhexanoate | (parts) | — | — | — | — | — |
|  | 2-ethyl-4-methylimidazole | (parts) | — | — | — | — | — |
| Evaluation results | Tensile strength | (MPa) | 3.6 | 4.6 | 3.0 | 3.4 | 13.5 |
|  | Change rate ΔS in tensile strength before and after heat treatment | (%) | −2 | −3 | −4 | −2 | −5 |
|  | Ozone resistance |  | 1 | 1 | 1 | 1 | 1 |

|  |  |  | Examples | | Comparative Examples | |
|---|---|---|---|---|---|---|
|  |  |  | 6 | 7 | 1 | 2 |
| Liquid polymers | Liquid monocyclic olefin ring-opened polymer having hydroxyl group at each of both ends (A-1) | (parts) | — | — | — | — |
|  | Liquid monocyclic olefin ring-opened polymer having hydroxyl group at each of both ends (A-2) | (parts) | — | — | — | — |
|  | Liquid monocyclic olefin ring-opened polymer having hydroxyl group at each of both ends (A-3) | (parts) | — | — | — | — |
|  | Liquid monocyclic olefin ring-opened polymer having triethoxysilyl group at each of both ends (A-4) | (parts) | — | — | — | — |
|  | Liquid monocyclic olefin ring-opened polymer having methacryloyloxy group at each of both ends (A-5) | (parts) | 100 | — | — | — |
|  | Liquid monocyclic olefin ring-opened polymer having hydroxycarbonyl group at each of both ends (A-6) | (parts) | — | 100 | — | — |
|  | Liquid monocyclic olefin ring-opened polymer having no reactive group at each of ends (A'-7) | (parts) | — | — | — | 100 |
|  | Liquid polybutadiene having hydroxyl group at each of both ends (A'-8) | (parts) | — | — | 100 | — |
| Crosslinkable compounds | Polymeric MDI | (parts) | — | — | 12 | 12 |
|  | Methyltrimethoxysilane | (parts) | — | — | — | — |
|  | 2,4,6-tris(dimethylaminomethyl)phenol | (parts) | — | — | — | — |
|  | N-(2-aminoethyl)-3-aminopropyltrimethoxysilane | (parts) | — | — | — | — |
|  | Bisphenol A liquid epoxy resin | (parts) | — | — | — | — |
|  | Pentaerythritol tetraacrylate | (parts) | 5 | — | — | — |
|  | Bisphenol F liquid epoxy resin | (parts) | — | 50 | — | — |
|  | 3,3'-diethyl-4,4'-diaminodiphenylmethane | (parts) | — | 20 | — | — |
| Crosslinking promoters | Dibutyltin dilaurate | (parts) | — | — | 0.05 | 0.05 |
|  | Tributyl phosphite | (parts) | — | — | — | — |
|  | t-aminoperoxy-2-ethylhexanoate | (parts) | 2 | — | — | — |
|  | 2-ethyl-4-methylimidazole | (parts) | — | 1 | — | — |
| Evaluation results | Tensile strength | (MPa) | 5.0 | 12.1 | 1.7 | Not crosslinked |
|  | Change rate ΔS in tensile strength before and after heat treatment | (%) | −2 | −5 | −40 |  |
|  | Ozone resistance |  | 1 | 1 | 3 |  |

As shown in Table 1, a crosslinked product obtained by using a crosslinkable composition containing: a liquid monocyclic olefin ring-opened polymer (A) having a reactive group at a polymer chain end thereof and a weight-average molecular weight (Mw) of 1,000 to 50,000; and a crosslinkable compound (B) having, in the molecule, two or more functional groups reactive with the reactive group at the polymer chain end of the liquid monocyclic olefin ring-opened polymer (A) had high tensile strength, a change rate ΔS of tensile strength before and after a heat treatment suppressed to a low level, and excellent heat resistance and ozone resistance (Examples 1 to 7).

Meanwhile, when liquid polybutadiene was used as the liquid polymer, the absolute value of a change rate ΔS of tensile strength before and after a heat treatment was large, which caused poor heat resistance and ozone resistance (Comparative Example 1).

When the liquid monocyclic olefin ring-opened polymer having no reactive group at a polymer chain end thereof was used, the crosslinking reaction did not advance, which could not provide a crosslinked product (Comparative Example 2).

The invention claimed is:
1. A crosslinkable composition comprising:
a liquid monocyclic olefin ring-opened polymer (A) having a reactive group at a polymer chain end thereof and a weight-average molecular weight (Mw) of 1,000 to 50,000; and a crosslinkable compound (B) having, in the molecule, two or more functional groups reactive with the reactive group at the polymer chain end of the monocyclic olefin ring-opened polymer (A), wherein the liquid monocylic olefin ring-opened polymer (A) is a copolymer containing a structural unit derived from cyclopentene and a structural unit derived from a monomer copolymerizable with cyclopentene as repeating structural units and having the reactive group at the polymer chain end thereof, the monomer copolymerizable with cyclopentene being a monocyclic diolefin, a polycyclic monoolefin, or a polycyclic diene, the liquid monocyclic olefin ring-opened polymer (A) contains, as repeating structural units, a structural unit derived from cyclopentene at a ratio of 70 mol % or more based on all repeating units, the reactive group at the polymer chain end of the monocyclic olefin ring-opened polymer (A) is a hydroxyl group or a hydroxycarbonyl group; and the functional group of the crosslinkable compound (B) is an isocyanate group, an epoxy group, or an amino group.

2. The crosslinkable composition according to claim 1, wherein the monocyclic olefin ring-opened polymer (A) has a melt viscosity of 3,000 Pa·s or less as measured at a temperature of 25° C. using a Brookfield viscometer.

3. The crosslinkable composition according to claim 1, wherein the monocyclic olefin ring-opened polymer (A) has a glass transition temperature of −50° C. or less.

4. The crosslinkable composition according to claim 1, wherein the monomer copolymerizable with cyclopentene is 1,5-cyclooctadiene, 2-norbornene, or dicyclopentadiene.

5. The crosslinkable composition according to claim 1, wherein said ratio is 75 mol % or more.

6. The crosslinkable composition according to claim 1, wherein said ratio is 80 mol % or more.

7. The crosslinkable composition according to claim 1, wherein said weight-average molecular weight (Mw) is 1,500 to 45,000.

8. The crosslinkable composition according to claim 1, wherein said weight-average molecular weight (Mw) is 2,000 to 40,000.

9. The crosslinkable composition according to claim 2, wherein said melt viscosity is 2,000 Pa·s or less as measured at a temperature of 25° C. using a Brookfield viscometer.

10. The crosslinkable composition according to claim 2, wherein said melt viscosity is 1,000 Pa·s or less as measured at a temperature of 25° C. using a Brookfield viscometer.

11. The crosslinkable composition according to claim 2, wherein said melt viscosity is 300 Pa·s or less as measured at a temperature of 25° C. using a Brookfield viscometer.

12. The crosslinkable composition according to claim 3, wherein said glass transition temperature is −60° C. or less.

13. The crosslinkable composition according to claim 3, wherein said glass transition temperature is −70° C. or less.

* * * * *